H. W. CASE.
SIFTER.
APPLICATION FILED FEB. 9, 1909.
934,283.
Patented Sept. 14, 1909.
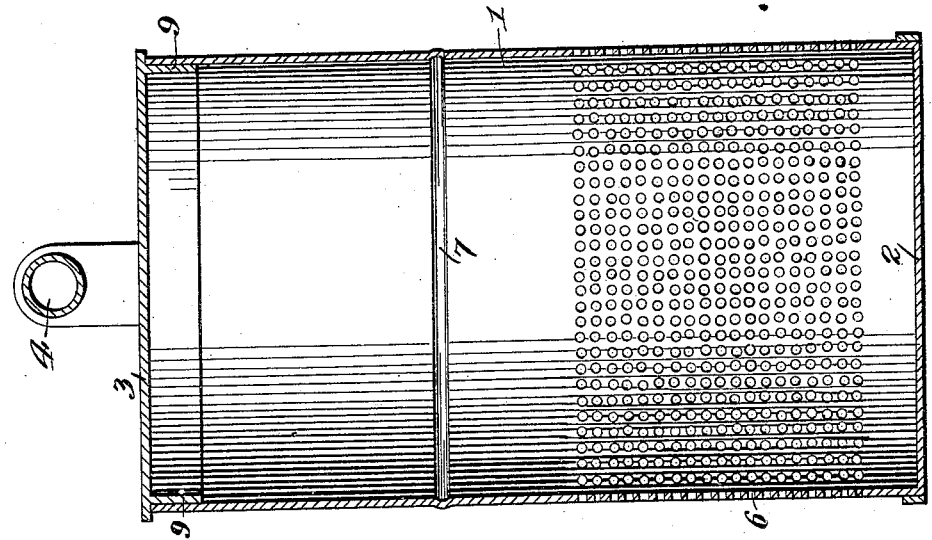
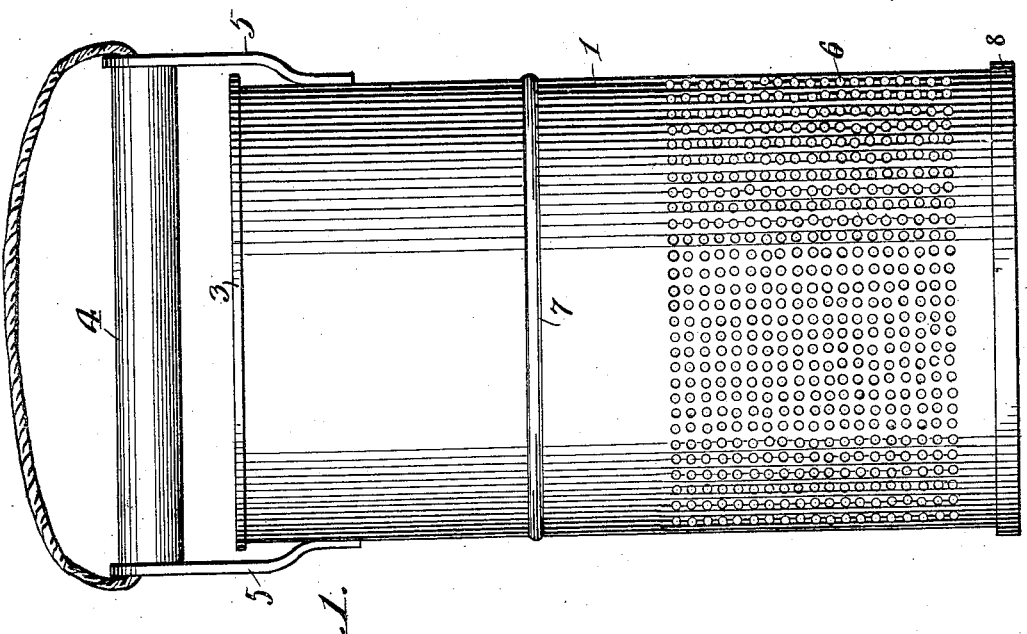
Inventor
Homer W. Case.
Witnesses
William C. Linton.
P. M. Smith.
By Victor J. Evans,
Attorney

UNITED STATES PATENT OFFICE.

HOMER W. CASE, OF CLINTON CORNERS, NEW YORK.

SIFTER.

934,283.    Specification of Letters Patent.    Patented Sept. 14, 1909.

Application filed February 9, 1909. Serial No. 476,984.

*To all whom it may concern:*

Be it known that I, HOMER W. CASE, a citizen of the United States, residing at Clinton Corners, in the county of Dutchess and State of New York, have invented new and useful Improvements in Sifters, of which the following is a specification.

This invention relates to sifters, the object of the invention being to produce a cheap, simple, durable, and practical device of the class described which is especially designed for sprinkling or dusting plants with material in dry powdered form such as a mixture of plaster and paris green or flour and lime and the like.

The invention is especially designed with reference to the needs of farmers to enable them to quickly and effectively dust potato and other vines with suitable material which will free the same from potato bugs and the like, the device being manipulated by hand and being of such a character as to enable the plants to be treated while the operator is walking practically at full speed.

With the above and other objects in view, the nature of which will more fully appear as the description proceeds, the invention consists in the novel construction, combination and arrangement herein fully described, illustrated and claimed.

In the accompanying drawings:—Figure 1 is a side elevation of the improved sifter. Fig. 2 is a vertical diametrical section through the same taken at right angles to Fig. 1.

The body 1 of the sifter is of cylindrical form as clearly shown in the drawings and may be of any suitable dimensions in accordance with the capacity desired, the said cylinder being closed by a bottom 2 and being provided with a removable cover or lid 3. The sifter is also provided with a handle 4, which is connected to the body by means of arms 5 which are permanently secured in any convenient manner at their lower ends to the body 1 and provided at their upper ends with openings to receive the opposite extremities of the handle 4, the latter being tubular for a purpose which will hereinafter appear.

The body 1 is perforated as shown at 6 to allow for the scattering of the powder contained therein, this being accomplished by oscillating the body or quickly turning the same in reverse directions while the handle 4 is grasped in the hand of the operator. In the preferred embodiment of this feature of the invention, only the lower portion, approximately the lower half, of the body is perforated as shown in Figs. 1 and 2 so that the weight of the material above the perforated portion will assist in forcing the powdered material outward through the perforations causing the said powder to be centrifugally thrown upon and over the plants adjacent to which the device is operated by the attendant by walking between the rows of plants.

Intermediate the height of the body 1, the latter is swaged outwardly at one or more points as shown at 7 to form reinforcing circumferential corrugations which add materially to the strength of the body, while around the bottom edge of said body is placed a wear band 8 which also acts as a reinforce. The cover 3 is flanged as shown at 9 to fit tightly upon the upper end of the body and retain itself in position. This cover is not in any way connected with the handle by which the device is carried and operated.

By making the handle 4 tubular as shown, a piece of rope or belting may be passed through said handle from end to end and connected above the handle to form a flexible loop which may be twisted by the hand of the operator to give a greater degree of oscillatory movement to the sifter than could be conveniently imparted thereto when the handle 4 is grasped by the hand.

With the construction above described it is practical for the farmer to carry one of such sifters in each hand and simultaneously dust or sprinkle two rows of plants. It has been found in practice that a single operator is able to cover an acre of ground in an hour's time by means of the sifter hereinabove described.

I claim:—

A sifter of the class described comprising a cylindrical body having a portion of the cylindrical wall thereof perforated, said handle being adapted to receive a rope through the bore thereof, a removable cover for said body, handle supporting arms connected rigidly to the body at diametrically opposite points and extending above the same and provided with openings, and a tubular handle having the extremities thereof fitted and held in said openings, substantially as described.

In testimony whereof I affix my signature in presence of two witnesses.

HOMER W. CASE.

Witnesses:
JOHN H. ROBINSON,
FOSTER E. OAKLEY.